(No Model.)

2 Sheets—Sheet 1.

R. RODGERS.
VEHICLE.

No. 469,092.

Patented Feb. 16, 1892.

Fig. 1.

Fig. 2.

WITNESSES:
F. McArdle.
C. Sedgwick

INVENTOR:
R. Rodgers
BY Munn & Co.
ATTORNEYS

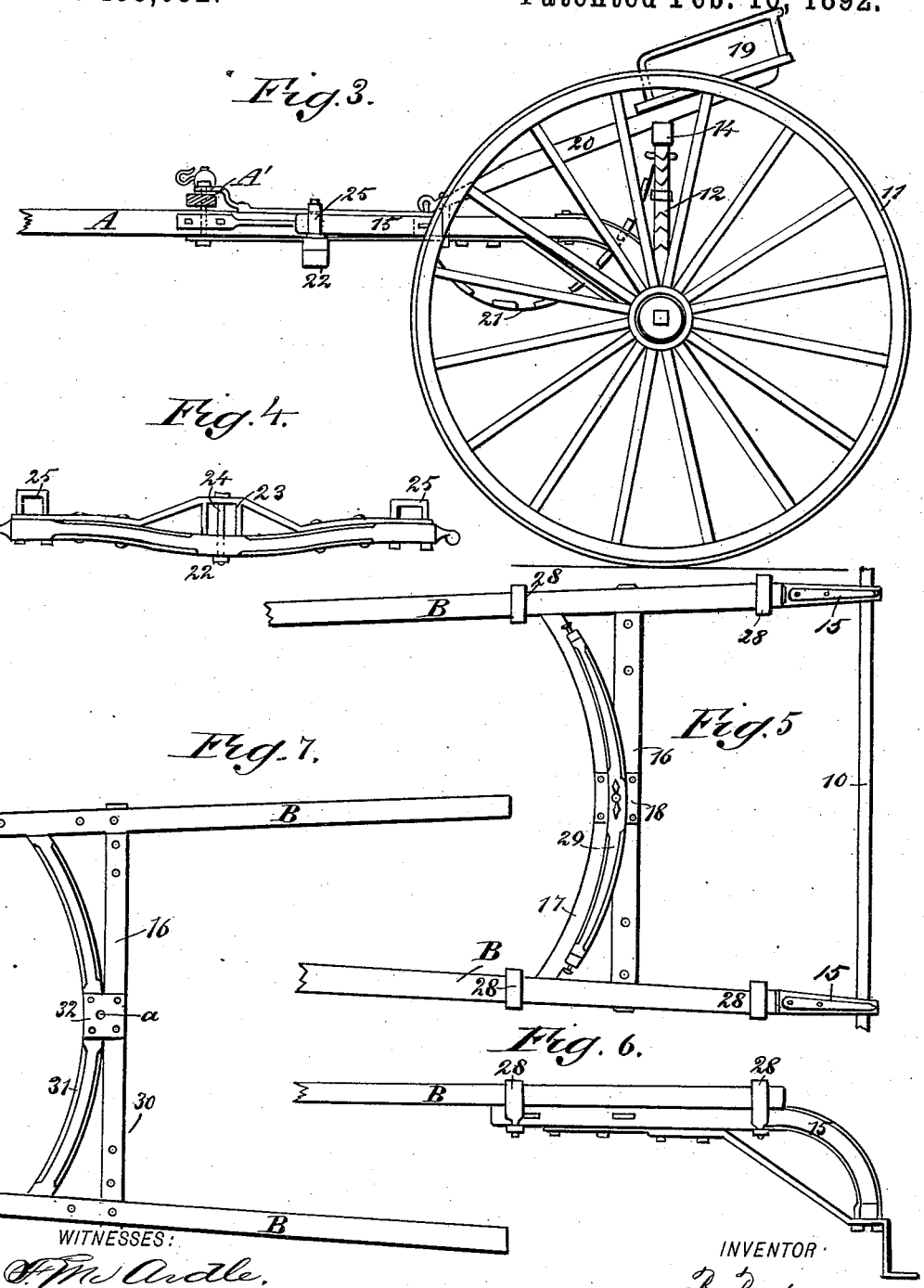

UNITED STATES PATENT OFFICE.

RICHARD RODGERS, OF CHEYENNE, WYOMING.

VEHICLE.

SPECIFICATION forming part of Letters Patent No. 469,092, dated February 16, 1892.

Application filed April 18, 1891. Serial No. 389,430. (No model.)

*To all whom it may concern:*

Be it known that I, RICHARD RODGERS, of Cheyenne, in the county of Laramie and State of Wyoming, have invented a new and useful Improvement in Vehicles, of which the following is a full, clear, and exact description.

My invention relates to an improvement in vehicles, especially to that class of vehicles known as "carts" or "sulkies," and has for its object to provide a simple, durable, and economic construction, and a means whereby a tongue or pole and shafts may be used interchangeably and adjusted so as to bring the horse as near the driver's seat as desired, the especial object of the invention being to construct a vehicle adapted for use in breaking horses to harness.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the vehicle. Fig. 2 is a rear elevation thereof. Fig. 3 is a side elevation of the vehicle, as shown in Fig. 1. Fig. 4 is a side elevation of a cross-beam adapted for attachment to the detachable pole or tongue. Fig. 5 is a plan view of a portion of the vehicle, illustrating the application thereto of the shafts. Fig. 6 is a side elevation of the vehicle, as shown in Fig. 5; and Fig. 7 is a plan view of a slight modification illustrating the construction of the shafts when they are made adjustable upon the body of the vehicle.

The axle 10 is provided with the usual wheels 11, two in number, and upon the axle a spring 12 is clipped or otherwise secured, the said spring being preferably one of what is known as the "elliptical type," and upon the upper side of the spring a bar 14 is securely fastened. The side bars 15 of the vehicle are curved at their rear ends, and the rear extremities of said bars are clipped or otherwise attached to the axle, one near each wheel 11, as is best shown in Fig. 2. The side bars 15 are preferably made to converge at their outer or forward ends to a slight degree, and are usually connected by a transverse bar 16, preferably secured to the under face of the side bars and a semicircular bar 17, the concaved face of which is at the front, and the extremities of which are secured to the side bars and the central portion of the straight transverse bar 16, against which it abuts. The upper faces of both bars 16 and 17 at their point of junction are provided with a wear-plate 18, a similar plate being likewise located upon the under faces of the bars, if in practice it be found desirable. The plate 18 is provided with an opening in corresponding position to the opening *a*, illustrated in Fig. 7. The driver's seat 19 has attached thereto, near its ends, supporting-beams 20, which beams are hinged at their lower ends upon the straight cross-bar 16, and the under faces of the beam, near their upper ends, rest upon the spring-bar 14, over which they project, as shown in Fig. 3. Thus as the lower extremities of the said supporting-bars 20 are hinged the occupant of the seat is enabled to derive the full benefit of the action of the spring 12. A curved platform 21 is usually attached at its upper end to the spring-bar 14, and at its lower or forward end to the straight cross-bar 16 or to the side bars 15, as illustrated in Fig. 3.

The main object of the invention is to provide in connection with the body just described a tongue or pole and shafts, which may be interchangeably used in connection therewith and which are capable of being adjusted thereon so as to bring the animal to be broken as near the driver's seat as may be desirable, or to remove the animal a sufficient distance from the body of the cart to prevent the cart from suffering from contact with the heels of said animal.

The tongue A, adapted for use in connection with the body of the vehicle, is provided with a cross-bar 22, located near its rear end. The cross-bar is shown in detail in Fig. 4, and is provided upon its upper face with a central yoke 23, through which the tongue is passed and by means of which it is secured to the cross-bar, the latter being accomplished by passing the bolt 24 through the yoke, the pole, and the bar. Near each end of the cross-bar 22 of the pole or tongue, upon its upper face, a yoke 25 is located, and upon the upper and lower faces of the pole or tongue at its rear end longitudinal straps 26 are secured, which extend beyond the rear ends of the pole, the rear extremities of the straps being threaded to receive nuts of proper description. If the pole or tongue is provided with a doubletree A', as shown in Figs. 2 and 3, it is pivoted in front of the cross-bar 22, as is best shown in the latter figure. The tongue or pole is attached to the body by causing the forward ends of the side bars 15 to enter and pass through the yokes 25 of the pole or tongue cross-bar, which will cause the projecting portions of the straps 26 to pass one over and the other under the wear-plates 18 of the body, and the tongue or pole is held in position against the draft strain by passing the threaded ends of the straps through apertures in a plate 27, which plate is held in engagement with the rear side face of the body cross-bar 16, as shown in Fig. 1, and the plate is locked in position by screwing the nuts upon the threaded ends of the straps to an engagement with the plate.

When it is desired to employ shafts B, the shafts are made of sufficient length to extend some distance backward upon the side bars 15, as illustrated in Fig. 6, and are secured to said side bars by clips 28 or their equivalents, as illustrated in Fig. 6, and when the shafts are employed a singletree 29 is pivoted upon the body by passing a suitable bolt through the tree and the apertures $a$ of the wear-plate. If in practice it is found desirable, the members of the shaft may be connected by a straight and a curved bar 30 and 31, corresponding to the bars 16 and 17 of the body, in which event the bars 30 and 31 are also provided with a wear-plate 32, apertured to receive a bolt for the purpose of pivoting the singletree. It is evident that either the pole or the tongue or the shafts may be adjusted either to or from the driver's seat, so as to remove an animal some distance from the front of the vehicle-body or to bring the animal or animals near thereto.

Having thus described my invention, I claim as new and desire to secure by Letters Patent—

1. The combination, with the wheeled axle having the short connected side bars 15 15 secured thereto at their rear downwardly-curved ends, of the removable and longitudinally-adjustable thills B B, having rearward extensions adapted to be clipped to the short side bars and provided with cross-bars 30 31, having an apertured connecting-plate 32, whereby the distance of the animal relative to the driver may be changed by adjusting the said extensions on the bars 15, substantially as set forth.

2. The combination, with the wheeled axle and the bars 15, curved down at their rear ends and secured to the axle, and the cross-bars 16 17, connecting the bars 15 near their forward ends, of the tongue-bar 22, having end clips 25 to receive the front ends of the bars 15, a central pole-receiving bracket or yoke 23, having a vertical bolt 24, and the pole extending through the bracket and having plates 26, crossing the bars 16 17 and projecting through the apertured plate 27, and nuts on the said plates, substantially as set forth.

RICHARD RODGERS.

Witnesses:
THOMAS M. JUNK,
STEPHEN D. HOUEY.